United States Patent [19]

Takeda et al.

[11] Patent Number: 4,826,641
[45] Date of Patent: May 2, 1989

[54] INJECTION MOLDING PROCESS

[75] Inventors: Yoshinobu Takeda; Kunio Yamamoto, both of Niigata, Japan

[73] Assignee: Mitsubishi Kinzoku Kabushiki Kaisha, Tokyo, Japan

[21] Appl. No.: 233,904

[22] Filed: Aug. 17, 1988

Related U.S. Application Data

[63] Continuation of Ser. No. 041,065, Apr. 22, 1987, abandoned, which is a continuation-in-part of Ser. No. 766,005, Aug. 15, 1985, abandoned.

[30] Foreign Application Priority Data

Aug. 16, 1984 [JP] Japan ................................ 59-170705

[51] Int. Cl.$^4$ ............................................. B29C 45/77
[52] U.S. Cl. ................................ 264/40.5; 264/328.1; 264/328.9; 425/149
[58] Field of Search .................... 264/40.1, 40.5, 328.1, 264/328.7, 328.9, 328.12, 328.13, 328.14, 328.16, 294; 425/149, 555, 590, 595

[56] References Cited

U.S. PATENT DOCUMENTS

| | | |
|---|---|---|
| 2,685,708 | 8/1954 | Pollack . |
| 3,632,729 | 1/1972 | Bielfeldt ............................. 264/294 |
| 4,205,950 | 6/1980 | Suss et al. ....................... 425/126 R |
| 4,309,379 | 1/1982 | Dannels ............................ 264/328.2 |
| 4,313,901 | 2/1982 | Chu ..................................... 264/127 |
| 4,325,896 | 4/1982 | Rodgers, Jr. ........................ 264/40.1 |
| 4,366,110 | 12/1982 | Morita et al. .................. 264/328.13 |
| 4,609,516 | 9/1986 | Krishnakumar et al. ........... 264/255 |

FOREIGN PATENT DOCUMENTS

| | | |
|---|---|---|
| 506115 | 12/1979 | Australia . |
| 2532429 | 1/1977 | Fed. Rep. of Germany . |
| 2535426 | 2/1977 | Fed. Rep. of Germany . |
| 2612176 | 10/1977 | Fed. Rep. of Germany . |
| 1116870 | 4/1958 | France . |
| 2354189 | 1/1978 | France . |
| 2391059 | 12/1978 | France . |
| 59-64336 | 4/1984 | Japan . |

OTHER PUBLICATIONS

"Moulage Par Injection Mesure de la Pression a l'interieur du mobile", Caoutchoucs et Plastiques, No. 634, Oct. 1983, pp. 59–61.

Primary Examiner—Jan H. Silbaugh
Assistant Examiner—Mary L. Fertig
Attorney, Agent, or Firm—Cushman, Darby & Cushman

[57] ABSTRACT

In an injection molding process, male and female dies are first clamped together by a prescribed clamping force to provide surfaces defining a cavity of a prescribed extruded area therebetween. Then, a molten resin is injected at a prescribed injection pressure into the cavity until the cavity is filled with the molten resin. Subsequently, the molten resin filled in the cavity is held at a prescribed holding pressure, so that the resin within the cavity solidifies to produce a molded article. The injection pressure in the injecting step is controlled so as to decrease immediately before the cavity is filled with the molten resin to thereby prevent a pressure boost from occurring upon the termination of the injecting step. The holding pressure in the holding step is controlled in such a manner that a maximum of the pressure of the resin within the cavity in the holding step is higher than a maximum of the pressure of the resin within the cavity in the injecting step.

4 Claims, 3 Drawing Sheets

INJECTION MOLDING PROCESS

CROSS-REFERENCE TO RELATED APPLICATION

This is a continuation of application Ser. No. 07/041,065, filed Apr. 22, 1987, which was abandoned upon the filing hereof, and which, in turn, was a continuation-in-part of Ser. No. 06/766,005, filed Aug. 15, 1985, now abandoned.

BACKGROUND OF THE INVENTION

1. Field of the Invention

The present invention relates to an injection molding process which enables a plastic article of a greater extruded area to be molded under a relatively low clamping force.

2. Prior Art

In injection molding, a thermoplastic molding material is plasticized in an appropriate heating cylinder, then forced by plunger action through one or more orifices into mold cavities where the material solidifies to the desired shape. In such injection molding, the pressure of the material within the cavities has been conventionally controlled as depicted in FIG. 1. Specifically, a molten resin is first injected at a gradually increasing pressure, as indicated at 100. Then, when each cavity has been filled, there will be a pressure boost, as at 102, since an injection pressure is additionally exerted on the mold as a hydrostatic pressure. With this pressure boost, the molten resin is filled up in each cavity with a sufficient filling density to thereby prevent shrinkage and warpage of the molded article from occurring. Subsequently, the pressure of the molten resin will be decreased stepwise, as indicated at 104 and 106. In the first half as at 104, a solidified layer formed in the surface portion of the molten resin is pressed against the mold, so that the shrinkage and warpage are prevented from occurring in the outer peripheral portion of the molded article. In the latter half as at 106, the shrinkage and warpage are further prevented.

To confine the material properly in the mold cavity during the application of the injection pressure, an adequate clamping force is maintained against the mold. The clamping force has been conventionally determined so as to be not smaller than a force F defined by the following equation:

$$F = P \times A$$

where P is a maximum pressure of the resin within the cavity during molding operation and A is an extruded area or cross-section of the molded article. If the clamping force is smaller than the force F, a mold gap will be so enlarged that flash is caused to occur on the molded article. Specifically, in the conventional process described above, there is a pressure boost when the cavity has been filled with the molten resin, and the clamping force has to be determined in view of this pressure boost. Consequently, the extruded area of the article to be molded is limited substantially, resulting in low productivity.

SUMMARY OF THE INVENTION

It is therefore an object of the present invention to provide an injection molding process which makes it possible to mold a plastic article of a greater extruded area having an excellent quality under a limited clamping force, to thereby improve the productivity substantially.

According to the present invention, there is provided an injection molding process comprising the steps of clamping male and female dies together by a prescribed clamping force to provide surfaces defining a cavity of a prescribed extruded area therebetween, subsequently injecting a molten resin at a prescribed injection pressure into the cavity until the cavity is filled with the molten resin, and subsequently holding the molten resin filled in the cavity at a prescribed holding pressure to solidify the resin within said cavity to produce a molded article, the improvement comprising controlling the injection pressure in the injecting step so as to decrease immediately before the cavity is filled with the molten resin to thereby prevent a pressure boost from occurring upon the termination of the injecting step, and controlling the holding pressure in the holding step in such a manner that a maximum of the pressure of the resin within the cavity in the holding step is higher than a maximum of the pressure of the resin within the cavity in the injecting step.

DESCRIPTION OF THE PREFERRED EMBODIMENTS OF THE INVENTION

Figure 2:
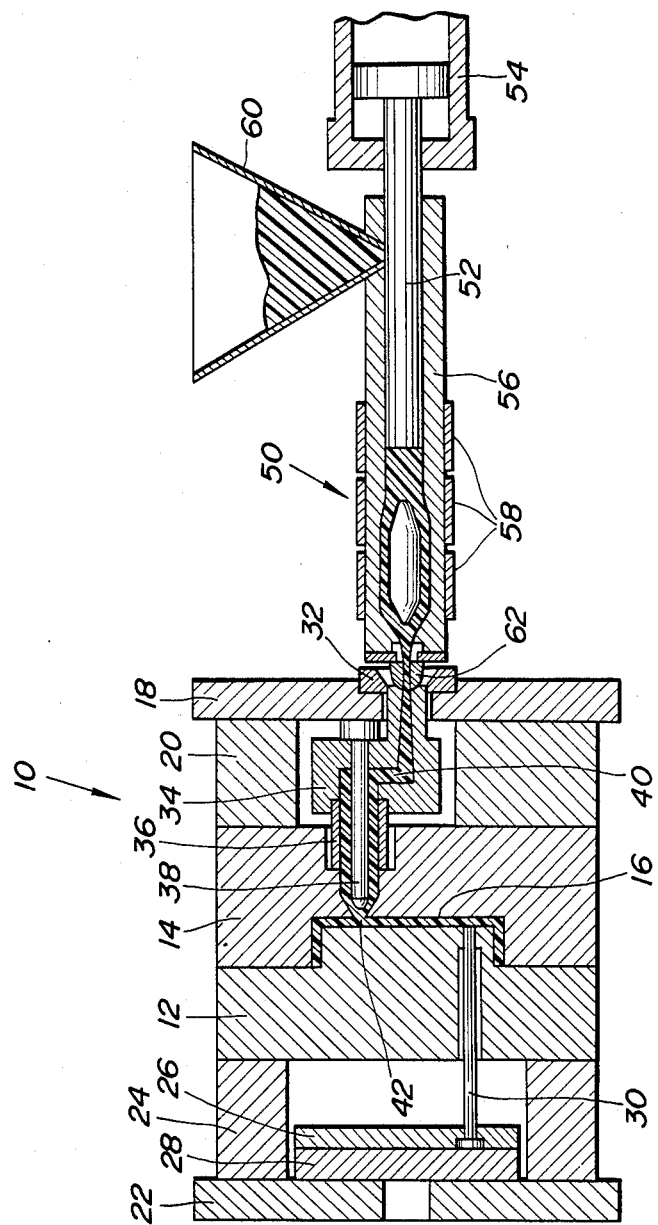
FIG. 2 is a cross-sectional view showing an injection molding press.

Embodiments of the present invention will now be described with reference to FIGS. 2 to 4 of the accompanying drawings.

An injection molding press employed for carrying out an injection molding process in accordance with the present invention is substantially identical in construction with a conventional one known to those skilled in the art, and will be first described briefly. Referring to FIG. 2, the press includes a die assembly 10, a clamping apparatus (not shown) and an injecting apparatus 50. The die assembly 10 is composed of male and female dies 12 and 14 which are to be clamped together by the clamping apparatus to define at least one mold cavity 16 therebetween. The female die 14 is mounted on a fixed bottom plate 18 through a spacer 20 while the male die 12 is mounted on a movable bottom plate 22 through a spacer 24. A pair of ejector plates 26 and 28 are movably mounted on the ejector guides (not shown) provided between the die 12 and the plate 22, with an ejector pin 30 extending from the ejector plates 26 and 28 away from the bottom plate 22. The movable bottom plate 22 is so slid on the base that the ejector pin 30 causes the mold product to eject from the cavity. The fixed bottom plate 18 has mounted thereon a locating ring 32 and a manifold 34 interfacing the injecting apparatus 50 to the die assembly 10. A runner bush 36 is mounted between the female die 14 and the manifold 34, and a torpedo spreader 38 extends into and through the runner bush 36. The female die 14, the runner bush 36 and the manifold 34 have formed therein a runner 40 communicating with a gate 42 which faces to the cavity 16.

The clamping apparatus may be a hydraulic ram or a combination of a hydraulic ram and a toggle mechanism. The injecting apparatus 50 includes a plunger 52 slidably received in a heating barrel 56 and reciprocally actuated by a hydraulic cylinder 54, the heating barrel 56 being heated by a heater 58. A hopper 60 is mounted on the heating barrel 56 adjacent to one end thereof, and a nozzle 62 is provided at the other end or tip of the heating barrel 56.

Although in the injection molding press described above, the clamping apparatus is designed so as to have the same maximum clamping force as the conventional apparatus, the die assembly 10 has a total extruded area twice as large as that of the conventional die assembly. Consequently, if the conventional injection molding process is applied, a mold gap formed between the male and female dies 12 and 14 will be so enlarged that a molded article having a sufficient quality cannot be obtained.

By the injection molding press as described above, the injection molding is carried out as follows. The male and female dies 12 and 14 of the die assembly 10 are first clamped together by the clamping apparatus to provide the cavity 16 therebetween. A thermoplastic molding material is loaded into the hopper 60 from which a controlled quantity is advanced into the heating barrel 56 to produce a molten resin. The molten resin is injected at a prescribed injection pressure through the nozzle 62 into the cavity 16 of the die assembly 10. After the cavity 16 is filled with the molten resin, the pressure of the molten resin is maintained at a prescribed holding pressure for a prescribed duration, so that the resin within the cavity solidifies to provide a molded article.

Figure 1:
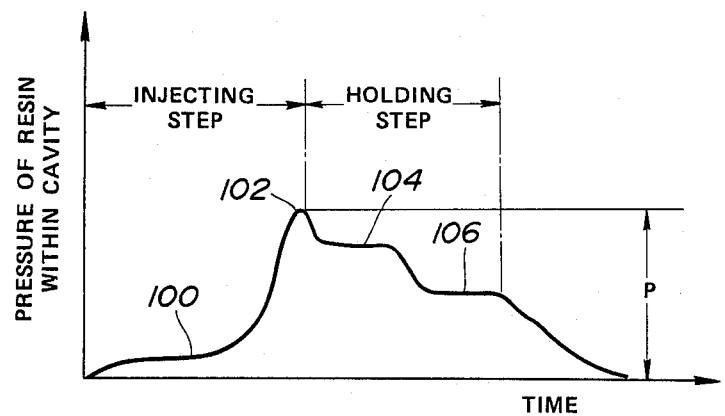
FIG. 1 is a graph of a pressure of resin within a cavity for explaining a conventional injection molding process.
Figure 3:
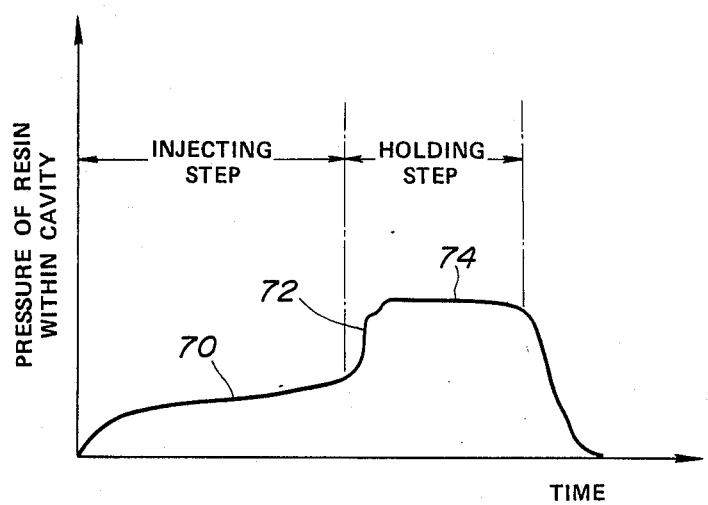
FIG. 3 is a graph similar to FIG. 1 for explaining an injection molding process in accordance with one embodiment of the present invention.

In the injection molding process in accordance with the present invention, the injection molding is performed in a pattern of pressure change as shown in FIG. 3. Specifically, the molten resin is injected into the cavity 16 at such an injection pressure as to cause the pressure of the molten resin within the cavity to increase gradually at a moderate rate, as indicated at 70, to fill the cavity 16 with the molten resin. Then, when the cavity 16 has been filled with the molten resin, the holding pressure is controlled in such a manner that in an early stage of the holding step, the pressure of the resin within the cavity is increased at a relatively high rate to a level higher than the maximum of the pressure of the molten resin in the cavity in the injecting step, as indicted at 72, and subsequently maintained at such a high level, as at 74, until the holding step comes to an end. Thus, in the injection step, the molten resin injected into the cavity 16 moves at such a low speed that that portion of the molten resin in contact with the surfaces of the dies 12 and 14 is solidified to form a thin hardened layer of the resin having a sufficient thickness on the cavity-defining surfaces of the dies 12 and 14. Further, inasmuch as there is no pressure boost upon the termination of the injecting step, a mold gap formed between the dies 12 and 14 are prevented from being enlarged too much. In a case that only a small mold gap is formed, the thin hardened layer of the resin prevents the molten resin from entering the gap, so that it becomes possible to mold an article of a large extruded area having no flash thereon. Also, since in the pressure holding step, the pressure of the molten resin within the cavity is increased to the level higher than the maximum pressure of the resin within the cavity in the injecting step, it is possible to prevent shrinkage and warpage from occurring in a molded article.

Figure 4:
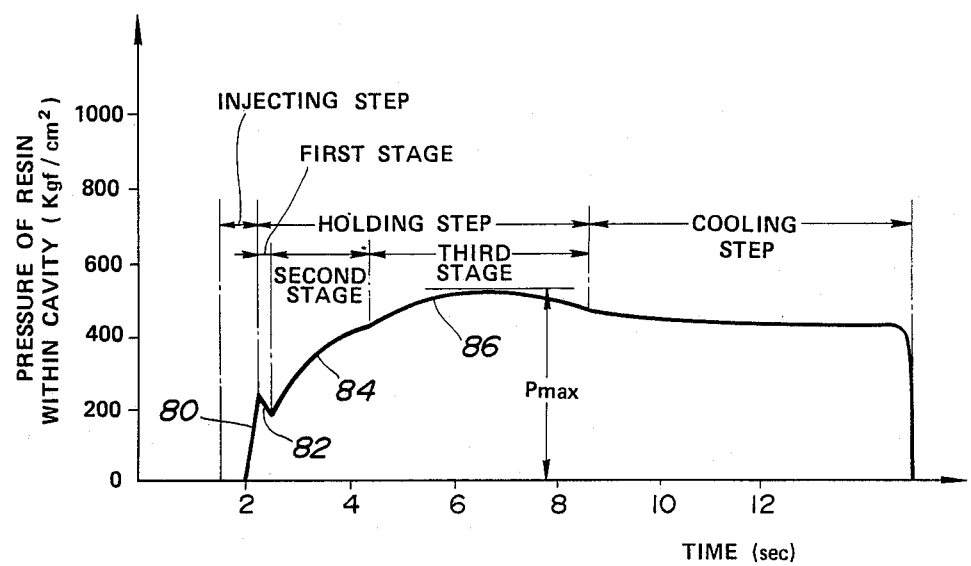
FIG. 4 is a graph similar to FIG. 1 for explaining an injection molding process in accordance with another embodiment of the present invention.

FIG. 4 shows a pattern of pressure change in the injection molding operation according to another embodiment of the present invention, in which 150 ton molding press is used to produce video cassette halves. In this embodiment, the molten resin is injected into the cavity 16 at such an injection pressure as to cause the pressure of the molten resin within the cavity to increase at relatively high rate to thereby introduce the molten resin into the cavity 16 in a short period of time. Then, the injection pressure is decreased to zero immediately before the cavity 16 is filled with the molten resin. Thus, the pressure of the resin within the cavity is increased, as indicated at 80, followed by a first stage of the holding step where the pressure of the molten resin within the cavity is decreased, as at 82. Consequently, there will be no pressure boost upon the termination of the injecting step, so that the mold gap between the male and female dies 12 and 14 are prevented from being enlarged too much. The time period of the injecting step may be preferably about 0.5 to 1.0 seconds while the time period for which the injection pressure is decreased to zero may not exceed about 5 seconds. In addition, since the injection pressure is decreased to zero before the cavity 16 is filled with the molten resin, that portion of the molten resin in contact with the surfaces of the dies 12 and 14 is solidified at this time to form a thin hardened layer of the resin having a sufficient thickness on the cavity-defining surfaces of the dies 12 and 14, and the layer is also formed on a parting plane between the male and female dies 12 and 14. Accordingly, even though a small mold gap is formed upon the termination of the injecting step, the layer prevents the molten resin from entering the mold gap, so that no flash would occur on the molded article.

Further, in the pressure holding step, the holding pressure is further controlled in a manner that the pressure of the resin within the cavity is increased gradually in the second stage of the pressure holding step, as at 84, to a level higher than a maximum of the pressure of the molten resin within the cavity in the injecting step. In this second stage, a solidified layer formed in the surface portion of the molten resin is pressed against the mold, so that the shrinkage and warpage are prevented from occurring in the outer peripheral portion of the molded article. In this stage, since the pressure of the resin within the cavity is increased to a considerably high level, the mold gap is liable to be enlarged. At this time, however, the thickness of the solidified layer is so thick that it is not broken due to the relative movement of the dies 12 and 14. Consequently, the molten resin inside the layer is definitely prevented from entering the mold gap. However, the pressure of the resin within the cavity has to be controlled optimally, and besides the time period of the second stage has to be determined optimally. Specifically, the pressure of the resin within the cavity is preferably controlled in such a manner that in an early stage it is increased at a relatively high rate and then increased at a moderate rate. The timer period of the second stage should be favorable about 1.0 to 2.0 sec.

Even after the termination of the second stage of the pressure holding step, there is still the molten resin inside the solidified layer. Consequently, in a third stage of the pressure holding step, as at 86, the pressure of the resin within the cavity is further increased to prevent shrinkage and warpage from occurring in the molded article, followed by a cooling step. In this stage, the pressure of the resin within the cavity is increased to the maximum, and therefore the mold gap is liable to be enlarged most. At this time, however, the solidified layer is so thick that it is not broken due to the mold gap. Further, in this stage, too, the pressure of the resin within the cavity has to be controlled optimally, and besides the time period has to be determined optimally. Specifically, the pressure of the resin within the cavity has to be controlled in such a manner that in the early stage it is increased at a prescribed rate to the maximum pressure $P_{max}$ and then decreased at a moderate rate. The maximum pressure is preferably determined so as to be about twice the maximum of the pressure of the resin within the cavity in the injection step. The time period of the third stage should be favorably about 3.0 to 6.0 sec. Further, the pressure of the resin within the cavity in the third stage of the pressure holding step may be increased until the pressure holding step comes to an end.

As described above, in the present invention, since the injection is performed so that there will be no pressure boost when the cavity has been filled with the molten resin, the mold gap is not enlarged too much, so that flash is prevented from occurring on the molded article. In addition, since in the pressure holding step, the pressure of the resin within the cavity is increased to a level higher than the maximum of the pressure of the resin within the cavity in the injecting step, the resin filled in the cavity is subjected to sufficient pressure to thereby prevent shrinkage and warpage from occurring in the molded article. Accordingly, even if the injection molding press has the same mold clamping capacity as that of the conventional one, it would be possible to mold an article of a greater extruded area without causing flash, shrinkage and warpage to occur in the finished molded article, thereby increasing productivity substantially.

What is claimed is:

1. In an injection molding process comprising the steps of:
    (a) providing an injection molding press which comprises at least one male die, at least one female die, clamp means for clamping said male and female dies together to provide surfaces defining a cavity therebetween, and injection means for injecting a thermoplastic molten resin into said cavity with a prescribed holding pressure;
    (b) subsequently clamping said male and female dies together at a prescribed clamping force by said clamp means to provide said cavity therebetween;
    (c) subsequently injecting the molten resin at a prescribed injection pressure into said cavity by said injection means to fill said cavity with said molten resin; and
    (d) subsequently holding said molten resin filled in said cavity at said prescribed holding pressure to solidify the resin with the cavity to produce a molded article;
    the improvement comprising controlling said injection pressure in said injection step so as to decrease said injection pressure immediately before said cavity is filled with said molten resin to thereby prevent a pressure boost from occurring upon termination of the injection step and controlling said holding pressure so as to decrease the pressure of the resin within the cavity in an early stage of said holding step to a level lower than a maximum of the pressure of the resin within the cavity in said injecting step; and further controlling said holding pressure in such a manner that the pressure of the resin within the cavity in the holding step is increased gradually with the pass of time and subsequently to a maximum level higher than said maximum of the pressure of the molten resin within the cavity in said injecting step.

2. An injection molding process according to claim 1, in which said maximum pressure of the resin within the cavity in said holding step is about twice said maximum pressure of the resin within the cavity in said injecting step.

3. An injection molding process according to claim 1 or claim 2, in which said clamping force is smaller than a force F defined by the following relationship:

$$F = P \times A$$

where P is said maximum pressure of the resin within the cavity in the holding step and A is said extruded area of said cavity.

4. An injection molding process according to claim 1, in which said injection pressure in said injecting step is decreased to zero immediately before the cavity is filled with said molten resin.

* * * * *